(12) United States Patent
Xie

(10) Patent No.: US 11,415,489 B2
(45) Date of Patent: Aug. 16, 2022

(54) DUAL-MODE HIGH PRESSURE DIFFUSER

(71) Applicant: WUXI TECHMAC SCIENTIFIC INSTRUMENT CO., LTD, Wuxi (CN)

(72) Inventor: Yunfang Xie, Wuxi (CN)

(73) Assignee: WUXI TECHMAC SCIENTIFIC INSTRUMENT CO., LTD, Wuxi (CN)

( * ) Notice: Subject to any disclaimer, the term of this patent is extended or adjusted under 35 U.S.C. 154(b) by 223 days.

(21) Appl. No.: 16/474,073

(22) PCT Filed: Apr. 4, 2018

(86) PCT No.: PCT/CN2018/081885
§ 371 (c)(1),
(2) Date: Jun. 27, 2019

(87) PCT Pub. No.: WO2018/196575
PCT Pub. Date: Nov. 1, 2018

(65) Prior Publication Data
US 2020/0124504 A1  Apr. 23, 2020

(30) Foreign Application Priority Data

Apr. 24, 2017  (CN) .......................... 201710271615.1

(51) Int. Cl.
*G01N 1/22* (2006.01)

(52) U.S. Cl.
CPC ..... *G01N 1/2208* (2013.01); *G01N 2001/222* (2013.01)

(58) Field of Classification Search
CPC .......... G01N 1/2208; G01N 2001/222; G01N 1/2226; G01N 2001/2238

USPC .......... 73/28.05, 28.06, 863.22, 863.81, 864, 73/864.34
See application file for complete search history.

(56) References Cited

U.S. PATENT DOCUMENTS

| 2008/0087108 A1 | 4/2008 | Kreikebaum et al. |
| 2013/0149790 A1 | 6/2013 | Mennicken et al. |

(Continued)

FOREIGN PATENT DOCUMENTS

| CN | 104865106 A | 8/2015 |
| CN | 105911132 A | 8/2016 |
| CN | 205473778 U | 8/2016 |

(Continued)

*Primary Examiner* — Robert R Raevis
(74) *Attorney, Agent, or Firm* — Bayramoglu Law Offices LLC

(57) ABSTRACT

A dual-mode high pressure diffuser includes a sampling head lower housing and a sampling head upper housing, a top of the sampling head lower housing is provided with a petri dish holder; the sampling head upper housing is respectively provided with a gas diversion blocking plug and a gas diversion sieve plate at the top and bottom, a gas pipe connector is connected to a through-wall gas connector via a pipe, the through-wall gas connector is connected to a T-type gas connector, the T-type gas connector is connected to a pressure sensor and a safety valve at two ends, the safety valve is connected to a flow sensor, the flow sensor is connected to a pressure reducing valve, the pressure reducing valve is connected to a proportional valve; and the proportional valve is connected to adapter block.

4 Claims, 1 Drawing Sheet

(56) References Cited

U.S. PATENT DOCUMENTS

2018/0128671 A1* 5/2018 Paur .................. G01G 7/06
2018/0299356 A1* 10/2018 Aggarwal ............ G01N 1/2205

FOREIGN PATENT DOCUMENTS

| CN | 106324052 A | 1/2017 |
| CN | 106479875 A | 3/2017 |
| CN | 206074314 U | 4/2017 |
| CN | 107063765 A | 8/2017 |
| CN | 206696027 U | 12/2017 |

* cited by examiner

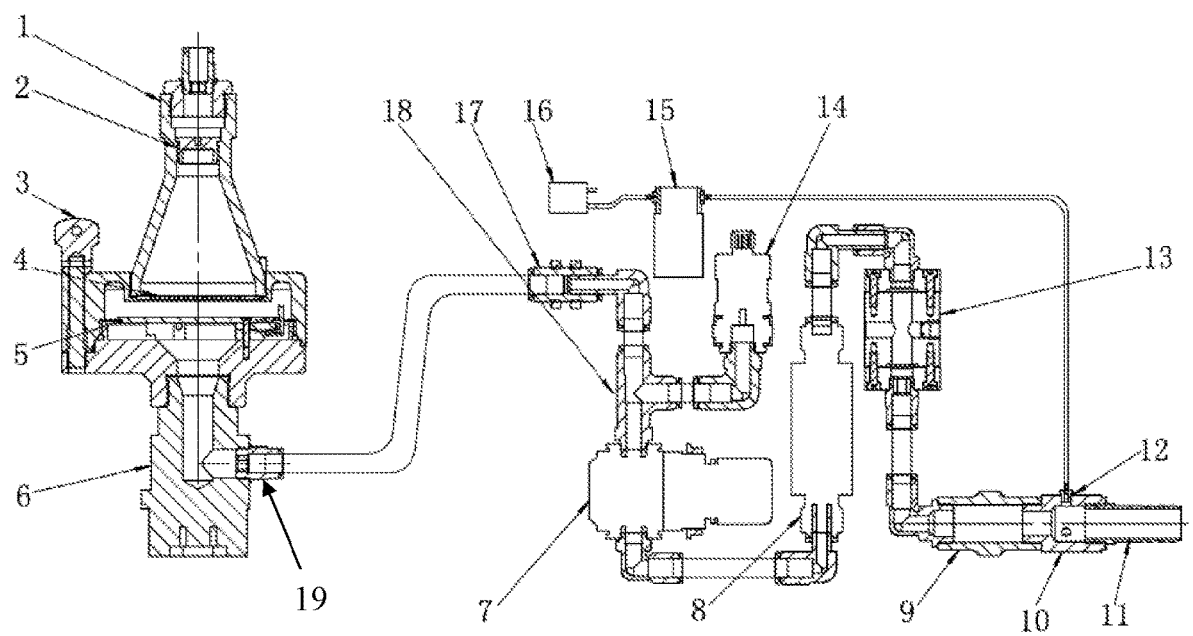

DUAL-MODE HIGH PRESSURE DIFFUSER

CROSS REFERENCE TO RELATED APPLICATIONS

This application is the national phase entry of International Application PCT/CN2018/081885, filed on Apr. 4, 2018 which is based upon and claims priority to Chinese Patent Application No. 201710271615.1, filed on Apr. 24, 2017 the entire contents of which are incorporated herein by reference.

TECHNICAL FIELD

The present invention pertains to the technical field of high pressure diffusers and relates to a dual-mode high pressure diffuser.

BACKGROUND

Compressed gas is widely used in pharmaceuticals, food and beverages, and other industrial productions. The quality of compressed gas coming in direct contact with the product directly affects the quality of the product, so there are strict requirements for the quality control of the compressed gas, among which particles and microorganism are two important indicators.

In the microbial detection of compressed gas, the commonly used detection methods include contact-plate method, sterile membrane method, liquid culture medium method, and vacuum filtration enrichment methods, etc. The contact-plate method is susceptible to the ambient air, so that the test result deviates significantly from the reality. A large part of the gas is discharged from the exhaust port during the sampling process of the sterile membrane method, so the microorganisms in the gas cannot be retained on the filter membrane. As a result, the accuracy of the detection is affected. The microorganisms cannot be quantitatively counted by using the liquid culture medium method. Although, the vacuum filtration enrichment method combines the advantages of the above methods, a variety of experimental consumables are needed to be prepared before the sampling. In the sampling process, a fixed gas velocity needs to be maintained and the operation process is complicated. There is a class of compressed gas samplers which can be directly connected to the compressed gas for sampling. However, such gas samplers only have a single sampling function and are unable to decompress the high-pressure gas to atmospheric pressure gas.

SUMMARY

Considering the above problems, the present invention provides a dual-mode high pressure diffuser. Given a structure in which a sampling head is separated with a main frame, the dual-mode high pressure diffuser has convenient, simple, and flexible operations. Also, the dual-mode high pressure diffuser can effectively implement the functions of microbial collection in constant pressure state and high pressure gas diffuser.

According to the technical scheme of the present invention, a dual-mode high pressure diffuser is provided, which includes a sampling head lower housing and a sampling head upper housing connected to each other, the top of the sampling head lower housing is provided with a petri dish holder for fixing a petri dish, the top of the sampling head upper housing is provided with a gas diversion blocking plug, the bottom of the sampling head upper housing is provided with a gas diversion sieve plate, a gas pipe connector of the sampling head lower housing is connected to a through-wall gas connector via a pipe, a gas outlet end of the through-wall gas connector is connected to a T-type gas connector, one end of the T-type gas connector is connected to a pressure sensor, another end of the T-type gas connector is connected to a safety valve, a gas outlet of the safety valve is connected to a gas inlet of a flow sensor, a gas outlet of the flow sensor is connected to a pressure reducing valve, a gas outlet of the pressure reducing valve is connected to a gas inlet of a proportional valve, a gas outlet of the proportional valve is connected to a gas outlet adapter block, the gas outlet adapter block is provided with a pressure sensing connection port, the pressure sensing connection port is connected to a gas inlet of an electromagnetic valve via a hose, a gas outlet of the electromagnetic valve is connected to a detection port of a differential pressure sensor, another detection port of the differential pressure sensor is connected to atmospheric air, a gas outlet of the gas outlet adapter block is connected to a gas outlet connector.

As a further improvement of the present invention, the sampling head lower housing and the sampling head upper housing are connected by a fastening handle.

As a further improvement of the present invention, the sampling head upper housing corresponds to a conical-shaped platform with an increased size from an upper side to a lower side between the gas diversion blocking plug and the gas diversion sieve plate.

As further improvement of the present invention, the gas pipe connector of the sampling head lower housing is perpendicular to an axis of the sampling head upper housing.

The present invention can obtain the following technical effects: the product according to the present invention has a simple and appropriate structure and an ingenious design, and can realize the function of microbial collection under constant-pressure and high-pressure gas diffuser.

BRIEF DESCRIPTION OF THE DRAWING

The FIGURE shows a structural schematic view of the present invention.

DETAILED DESCRIPTION OF THE EMBODIMENTS

The embodiments of the present invention will be further described with reference to the drawing, hereinafter.

As shown in the FIGURE, a dual-mode high pressure diffuser includes sampling head upper housing 1, gas diversion blocking plug 2, fastening handle 3, gas diversion sieve plate 4, petri dish holder 5, sampling head lower housing 6, safety valve 7, flow sensor 8, proportional valve 9, gas outlet adapter block 10, gas outlet connector 11, pressure sensing connection port 12, pressure reducing valve 13, pressure sensor 14, electromagnetic valve 15, differential pressure sensor 16, through-wall gas connector 17, T-type gas connector 18 etc.

The present invention is a dual-mode high pressure diffuser as shown in the FIGURE, which includes the sampling head lower housing 6 and the sampling head upper housing 1 that are connected to each other. The top of the sampling head lower housing 6 is provided with the petri dish holder 5 for fixing a petri dish, the top of the sampling head upper housing 1 is provided with the gas diversion blocking plug 2, and the bottom of the sampling head upper housing 1 is provided with the gas diversion sieve plate 4. A gas pipe connector 19 of the sampling head lower housing 6 is connected to the through-wall gas connector 17 via a pipe, and a gas outlet end of the through-wall gas connector 17 is connected to a T-type gas connector 18. One end of the T-type gas connector 18 is connected to the pressure sensor 14, and another end of the T-type gas connector 18 is connected to the safety valve 7. A gas outlet of the safety valve 7 is connected to a gas inlet of the flow sensor 8, a gas outlet of the flow sensor 8 is connected to a pressure reducing valve 13, a gas outlet of the pressure reducing valve 13 is connected to a gas inlet of the proportional valve 9, and a gas outlet of the proportional valve 9 is connected to a gas outlet adapter block 10. The gas outlet adapter block 10 is provided with the pressure sensing connection port 12, the pressure sensing connection port 12 is connected to a gas inlet of the electromagnetic valve 15 via a hose, a gas outlet of the electromagnetic valve 15 is connected to a detection port of a differential pressure sensor 16, another detection port of the differential pressure sensor 16 is connected to atmospheric air, and a gas outlet of the gas outlet adapter block 10 is connected to the gas outlet connector 11.

The sampling head lower housing 6 and the sampling head upper housing 1 are connected by the fastening handle 3.

The sampling head upper housing 1 corresponds to a conical-shaped platform with an increased size from an upper side to a lower side between the gas diversion blocking plug 2 and the gas diversion sieve plate 4.

The gas pipe connector 19 of the sampling head lower housing 6 is perpendicular to the axis of the sampling head upper housing 1.

An implementation of the microorganism collection in a constant pressure state: the through-wall gas connector 17 is externally connected to the sampling head, the sampling head gas inlet is connected to the high-pressure gas source, and the gas outlet connector 11 is connected to a silencer; the electromagnetic valve 15 is closed to protect the differential pressure sensor 16 from damage due to excessive differential pressure; the extent of opening and closing of the proportional valve 9 is controlled by the real-time detection of the dynamic pressure and the mass flow rate in the sampling head by the pressure sensor 14 and the flow sensor 8 to achieve the set pressure flow. The proportional valve 9 is closed when the gas sampling volume reaches the set gas sampling volume. After the completion of sampling, the high-pressure gas source is turned off, and the extent of opening and closing of the proportional valve 9 is adjusted by detecting the change rate of the pressure sensor 14, thereby realizing the function of slowly decompressing the high-pressure gas in the sampling head. The pressure reducing valve 13 is served to protect the proportional valve 9 from the impact of the high pressure gas.

An implementation of the high-pressure gas diffuser: the through-wall gas connector 17 is externally connected to the high pressure air source directly, the gas outlet connector 11 is a pagoda connector. The electromagnetic valve 15 is opened to ensure that the differential pressure sensor 16 can detect the pressure in the gas outlet adapter block 10. The detection control circuit is adopted to monitor the pressure in the gas outlet adapter block 10 through the differential pressure sensor 16. The extent of opening and closing of the proportional valve 9 is automatically adjusted to ensure the accurate provision of the required gas flow rate for the back-end detection equipment. As shown in the FIGURE, given the structure in which the sampling head is separated with the main frame, the operations of the sampling head are more convenient, simpler, and more flexible.

The sampling head upper housing 1 and the sampling head lower housing 6 are connected by the fastening handle, so the operation is simpler and more convenient. Also, the connection between the upper and lower housings is firmer and safer.

What is claimed is:

1. A dual-mode pressure reducer, comprising a sampling head lower housing and a sampling head upper housing, wherein the sampling head lower housing and the sampling head upper housing are connected to each other, a top of the sampling head lower housing is provided with a petri dish holder for fixing a petri dish; a top of the sampling head upper housing is provided with a gas diversion plug, a bottom of the sampling head upper housing is provided with a gas diversion sieve plate, a gas pipe connector of the sampling head lower housing is connected to a through-wall gas connector via a pipe, a gas outlet end of the through-wall gas connector is connected to a T-type gas connector, a first end of the T-type gas connector is connected to a pressure sensor, and a second end of the T-type gas connector is connected to a safety valve, a gas outlet of the safety valve is connected to a gas inlet of a flow sensor, a gas outlet of the flow sensor is connected to a pressure reducing valve, a gas outlet of the pressure reducing valve is connected to a gas inlet of a proportional valve; a gas outlet of the proportional valve is connected to a gas outlet adaptor block, the gas outlet adaptor block is provided with a pressure sensing connection port, the pressure sensing connection port is connected to a gas inlet of an electromagnetic valve via a hose, a gas outlet of the electromagnetic valve is connected to a first detection port of a differential pressure sensor, a second detection port of the differential pressure sensor is connected to atmospheric air, and a gas outlet of the gas outlet adaptor block is connected to a gas outlet connector.

2. The dual mode pressure reducer as claimed in claim 1, wherein the sampling head lower housing is connected to the sampling head upper housing via a fastening handle.

3. The dual-mode pressure reducer as claimed in claim 1, wherein the sampling head upper housing corresponds to a conical-shaped platform with an increased size from an upper side to a lower side between the gas diversion plug and the gas diversion sieve plate.

4. The dual mode pressure reducer as claimed in claim 1, wherein the gas pipe connector of the sampling head lower housing is perpendicular to an axis of the sampling head upper housing.

* * * * *